United States Patent
Järleholm et al.

(10) Patent No.: US 6,735,451 B1
(45) Date of Patent: May 11, 2004

(54) METHOD AND APPARATUS FOR PROVIDING DOWNLINK POWER CONTROL IN RADIO COMMUNICATION SYSTEMS EMPLOYING VIRTUAL CELLS

(75) Inventors: Anders Järleholm, Sollentuna (SE); Johan Jansson, Ljusterö (SE); Tomas Stolt, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 549 days.

(21) Appl. No.: 09/708,526

(22) Filed: Nov. 9, 2000

(51) Int. Cl.$^7$ .................................................. H04B 1/38
(52) U.S. Cl. ................... 455/561; 455/127.2; 455/522
(58) Field of Search .................... 455/561, 522, 455/103, 126, 127.2, 69; 370/310, 337, 347

(56) References Cited

U.S. PATENT DOCUMENTS

| | | | |
|---|---|---|---|
| 5,596,329 A | | 1/1997 | Searle et al. |
| 5,926,747 A | * | 7/1999 | Komara et al. ................ 455/69 |
| 6,072,788 A | * | 6/2000 | Peterson et al. ............. 370/337 |
| 6,104,935 A | * | 8/2000 | Smith et al. ............. 455/562.1 |
| 6,118,767 A | | 9/2000 | Shen et al. |
| 6,226,502 B1 | * | 5/2001 | Chung ......................... 455/118 |

FOREIGN PATENT DOCUMENTS

| | | |
|---|---|---|
| DE | 19839633 A1 | 3/2000 |
| WO | WO 99/01949 | 1/1999 |
| WO | WO 99/56349 | 11/1999 |

* cited by examiner

*Primary Examiner*—Denise Hopkin
*Assistant Examiner*—Quochien Ba Vuong

(57) ABSTRACT

Methods and base stations for controlling downlink power, especially in systems employing virtual cells, are described. By providing attenuators in each transmit signal processing chain, e.g., after upconverting to intermediate frequencies, downlink power control can be more finely tuned to different antenna elements.

15 Claims, 10 Drawing Sheets

METHOD AND APPARATUS FOR PROVIDING DOWNLINK POWER CONTROL IN RADIO COMMUNICATION SYSTEMS EMPLOYING VIRTUAL CELLS

BACKGROUND

The present invention relates generally to mobile telecommunication systems, and especially to downlink power control in such systems which employ, for example, virtual cells.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid rising prices.

FIG. 1 illustrates an example of a conventional cellular radio communication system 100. The radio communication system 100 includes a plurality of radio base stations 170a–n connected to a plurality of corresponding antennas 130a–n. The radio base stations 170a–n in conjunction with the antennas 130a–n communicate with a plurality of mobile terminals (e.g., terminals 120a, 120b and 120m) within a plurality of cells 110a–n. Communication from a base station to a mobile terminal is referred to as the downlink, whereas communication from a mobile terminal to the base station is referred to as the uplink.

The base stations are connected to a central controller, such as a mobile switching center (MSC) 150. Among other tasks, the MSC coordinates the activities of the base stations, such as during the handoff of a mobile terminal from one cell to another. The MSC, in turn, can be connected to a public switched telephone network 160, which services various communication devices 180a, 180b and 180c.

As more mobile stations subscribe to these types of systems, the demand for system capacity will increase rapidly, especially in highly populated areas. Conventionally, a process known as "cell splitting" was performed in order to enhance the originally developed cellular system to meet demand for increased capacity per unit area. As shown in FIG. 2, a base station B1 originally has three sector antennas not shown), each antenna supporting communications within a sector, i.e., sectors 1–3. To implement cell splitting, a new base station B2 is added, for example, in sector 1 to split the cell which was previously defined by the transmissions of base station B1. The new base station B2 also has three sector antennas forming three new sectors A, B and C. In conventional cell splits, the set of frequencies allocated for the base station B2 is more or less equally distributed for usage in the three new sectors A–C using a fixed allocation. Thus, the central controller, e.g., the MSC, will treat sectors A–C as, effectively, three separate, new cells and re-plan the available frequency band(s) on that basis. Although cell splitting can provide additional system capacity, it requires additional base station sites with associated infrastructure costs. Furthermore, the system (e.g., the MSC) continues to handle handover signaling when a mobile station moves between the cell sectors in a conventional manner. Thus, conventional cell splitting results in a significant increase in the loading of the access network, i.e., the links between base stations and MSCs and its processors, as the addition of more sectors results in more handovers and hence more signaling between the base stations and MSCs.

More recently, a concept known as "virtual cells" was developed to overcome this inefficiency. In the virtual cell concept, the base station B2 can use all of the frequencies allocated thereto arbitrarily in virtual cells A–C. One main difference with the virtual cell implementation as compared to the conventional cell split is that the base station B2 handles the handoff situation which occurs when the mobile moves between the virtual cells A–C. For example, in a virtual cell network, if a mobile station moves from cell A to cell B, the base station alone may handle the transition of the mobile station from cell A to cell B and neither the MSC nor the mobile need to be involved in a handoff process. Thus, virtual cells reduce the loading on the access network as compared with cell splitting. Furthermore, since the mobile makes no handoff, there is no impact on speech quality.

Those skilled in the art will recognize that it is generally desirable to tailor the base station's transmit (downlink) power for each connection to be only that which is necessary to provide a desired quality of service (QoS) as measured by, for example, a signal-to-noise ratio (SNR) experienced by a mobile station. For instance, in TDMA (time-division, multiple access) systems, downlink power control implies varying the power associated with transmissions to different mobile stations which are receiving signals in each frame. For example, as shown in FIG. 3, it is generally desirable to transmit bits to mobile station 310 (which is relatively close to the base station B2 positioned at the center of cells A, B and C) at a lower power level than those bits which are transmitted to mobile station 300 (which is more distant from the base station B2). Many examples of specific downlink power control techniques are known to those skilled in the art. For example, International Patent Application, WO 99/01949 discloses a power control apparatus operable in a conventional TDMA communication system. The power control apparatus includes a power level controller coupled to amplifier circuitry of each of a plurality of transmitter branches to control the power levels at which the communication signal bursts are transmitted on a particular carrier frequency by the base station. Another example of downlink power control can be found in U.S. patent application Ser. No. 09/057,793, entitled "Modified Downlink Power Control During Macrodiversity", filed on Apr. 9, 1998, the disclosure of which is incorporated here by reference.

These conventional downlink power control techniques, however, do not provide sufficiently selective power control to optimize downlink interference levels, particularly in systems which employ virtual cells. Accordingly, it would be desirable to provide communication techniques, and systems associated therewith, which would enable communications in systems employing a virtual cell structure and in a manner which was also conducive to enabling greater downlink power control.

SUMMARY

According to exemplary embodiments of the present invention, methods and apparatus for communicating in a telecommunications network include a processing unit for providing a first level of downlink power control (DPC1) at a baseband level on each of a plurality of carrier frequencies that are selectively supplied to a plurality of transmitters. Each of the transmitters is optionally coupled to a selector for providing the carrier frequencies to the antenna elements.

A second processing unit, e.g., a controllable attenuator, is coupled between the selector and each of the antenna elements for providing a second level of downlink power control (DPC2) to improve the efficiency of the system.

Base stations and methods for transmitting in radiocommunication systems according to the present invention have a number of different advantages. For example, by implementing a base station configuration which includes attenuators after the transmux, a coarse and fine downlink power control loop combination can be implemented. Moreover, selectors can be eliminated and the attenuators can be used to perform both power control and path selection in the base station. By using only one transmux per carrier frequency, the amount of hardware is minimized. This, in turn, increases the serving capacity of base stations since transmux hardware is typically a limiting factor associated therewith. Additionally, it now becomes possible to use a minimum of power output from the MCPA in time slots where no transmissions are needed. This promotes additional power savings and interference reduction.

Moreover, another advantage of base stations and methods according to the present invention involves the fact that the step error associated with DPC2 downlink power control is lower than that associated with DPC1 power control. This result stems from the fact that regulation after the transmux is performed at a higher sample rate. In fact, downlink power control at the baseband level can be replaced by downlink power control using just the attenuators downstream of the transmuxes.

BRIEF DESCRIPTION OF THE FIGURES

The objectives and advantages of the present invention will be understood by reading the following detailed description in conjunction with the drawings, in which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

The exemplary radio communication systems discussed herein are described as using the TDMA protocol, in which communication between the base station and the mobile terminals is performed over a number of time slots. However, those skilled in the art will appreciate that the concepts disclosed herein may find use in other protocols, including, but not limited to, frequency division multiple access (FDMA), code division multiple access (CDMA), or some hybrid of any of the above protocols. Likewise, some of the exemplary embodiments provide illustrative examples relating to the Global System for communications (GSM) system or the Digital Advanced Mobile Phone Service (ANSI 136) system, however, the techniques described herein are equally applicable to radio base stations in any system.

Figure 1:
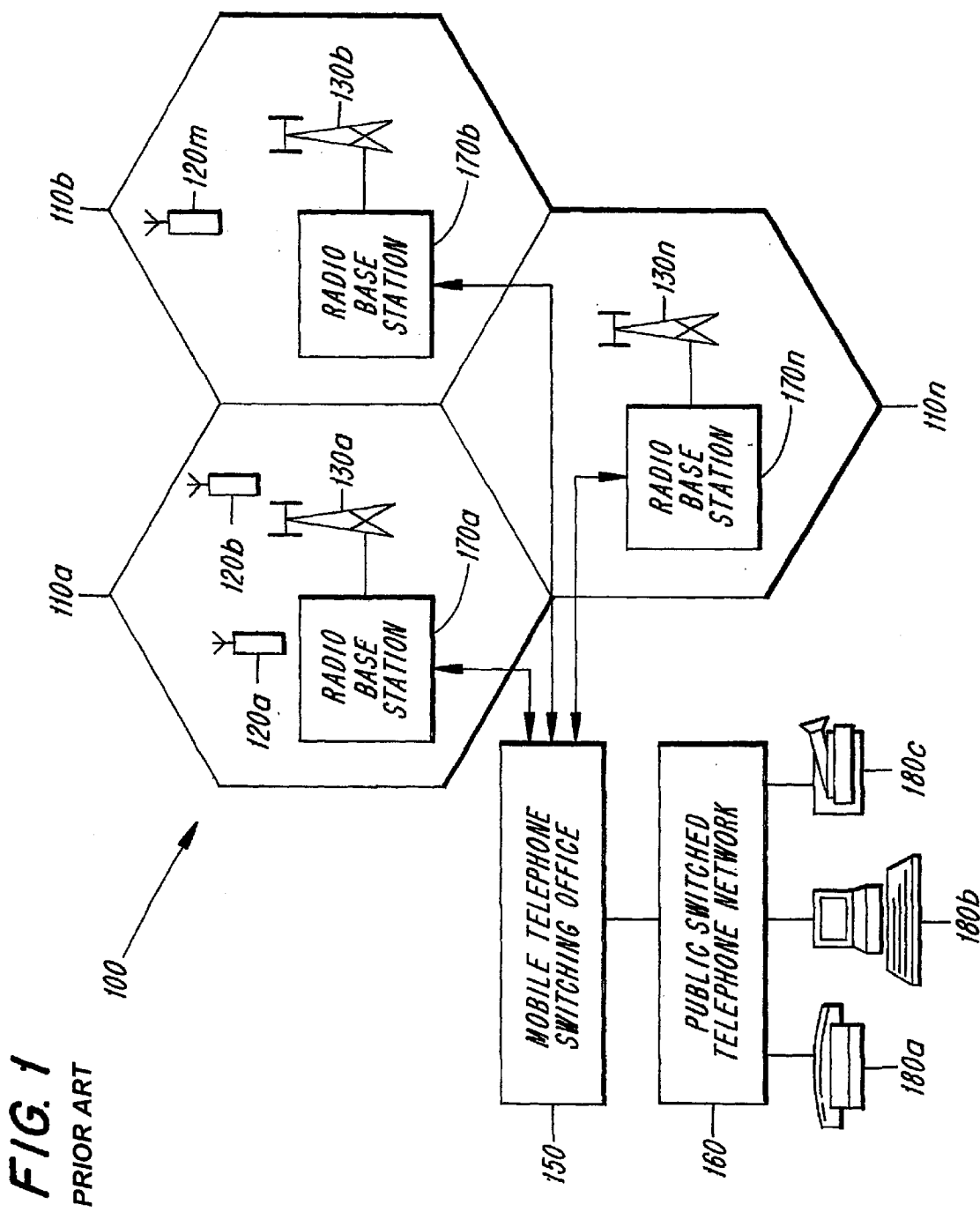
FIG. 1 depicts an exemplary cellular system in which the present invention can be implemented.
Figure 2:
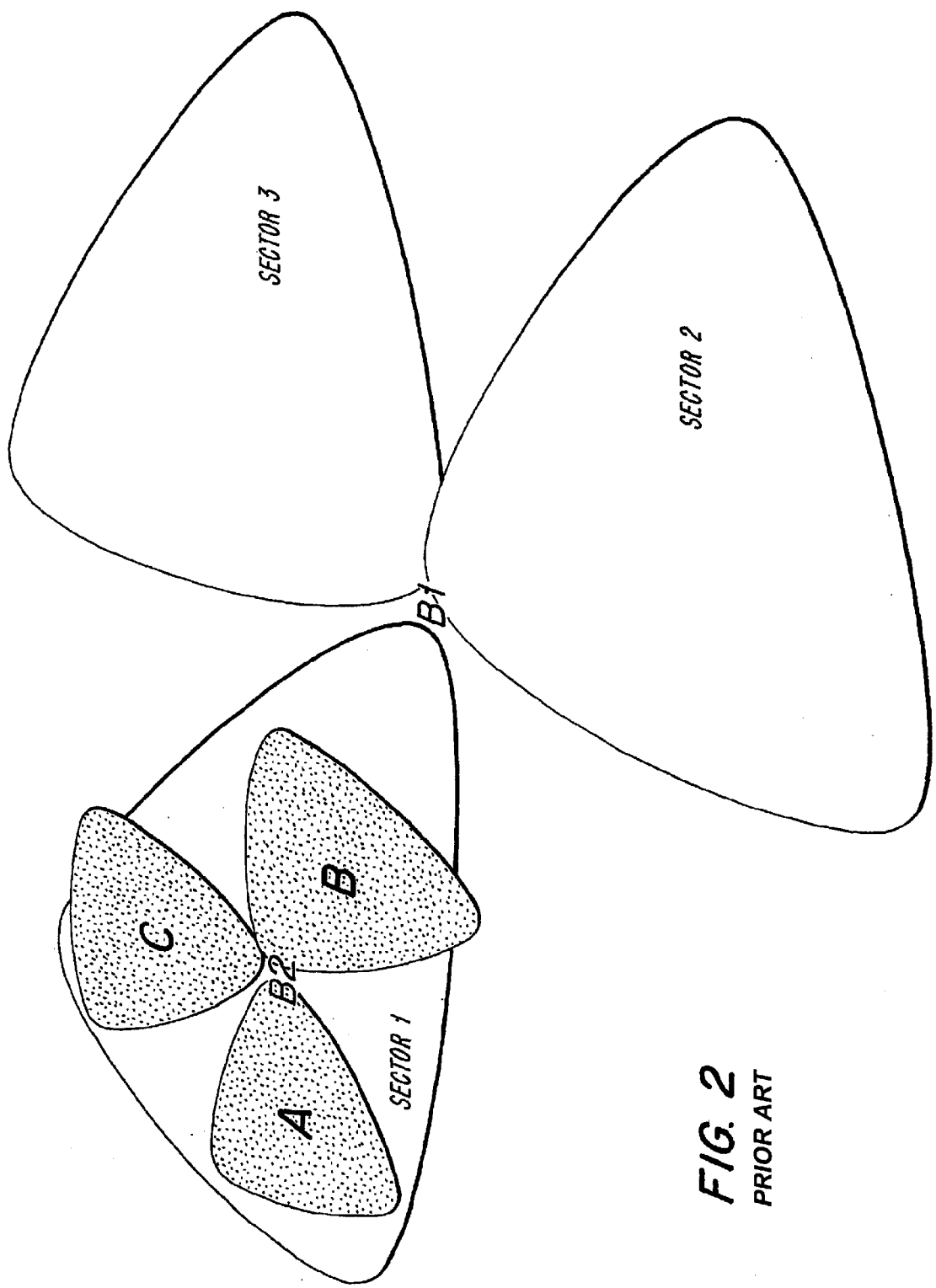
FIG. 2 is used to describe conventional cell splitting as well as a virtual cell extension of a cellular system in which the present invention can be implemented.
Figure 3:
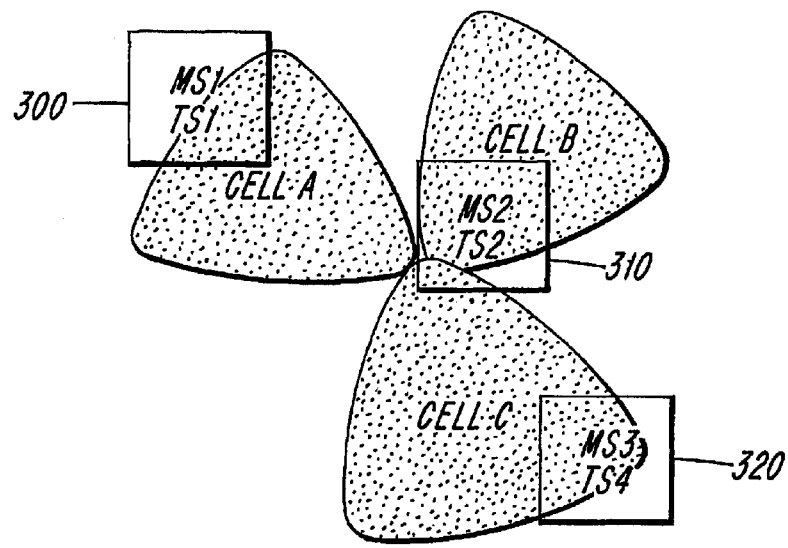
FIG. 3 depicts three mobile stations operating in different virtual cells supported by a single base station.
Figure 4:
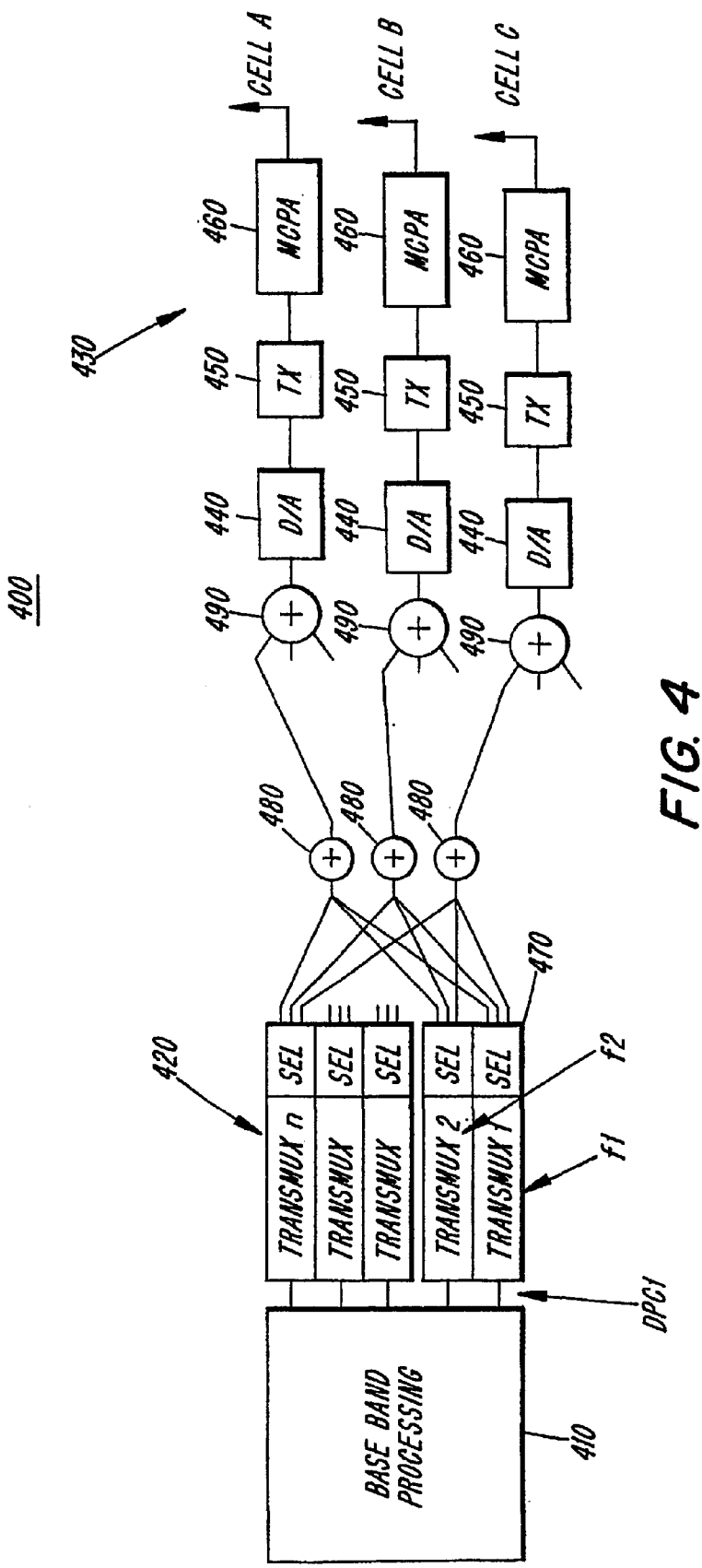
FIG. 4 illustrates a conventional base station configuration.

Referring now to FIGS. 3–8, a conventional architecture related to the present invention will now be described in order to better understand the problems associated therewith. FIG. 4 shows the architecture of a conventional base station and will be used to provide an example indicating how such a base station can be operated to serve a virtual cell (only the transmission part of the base station is shown) in radiocommunication systems operated in accordance with different standards. The base station 400 includes a base band processing unit 410 and a set of transmuxes 420 which are common to all sectors supported by the base station 400, as well as one wide band radio part 430 for each sector. The radio part 430 includes digital to analog converters 440, intermediate frequency (IF) to radio frequency (RF) stage (TX) 450, and a multi-carrier power amplifier (MCPA) 460. Each transmux 420 handles one carrier frequency (e.g., f1 is handled by transmux 1, f2 is handled by transmux 2 . . . fn is handled by transmux n). Thus, it will be appreciated that the number of transmuxes limits the number of carriers that a base station 400 can support. Each transmux 420 is equipped with a selector 470 so that the carrier can be switched on or off to the different sectors by a control unit (not shown). Each carrier is then passed through combiners 480 and 490 to an appropriate radio part, i.e., depending upon which carrier frequency f1, f2 . . . fn has been assigned to which virtual cell A–C. Combiners 480, 490 are used to add selected, individual channel bandwidths together for transmission.

Figure 5:
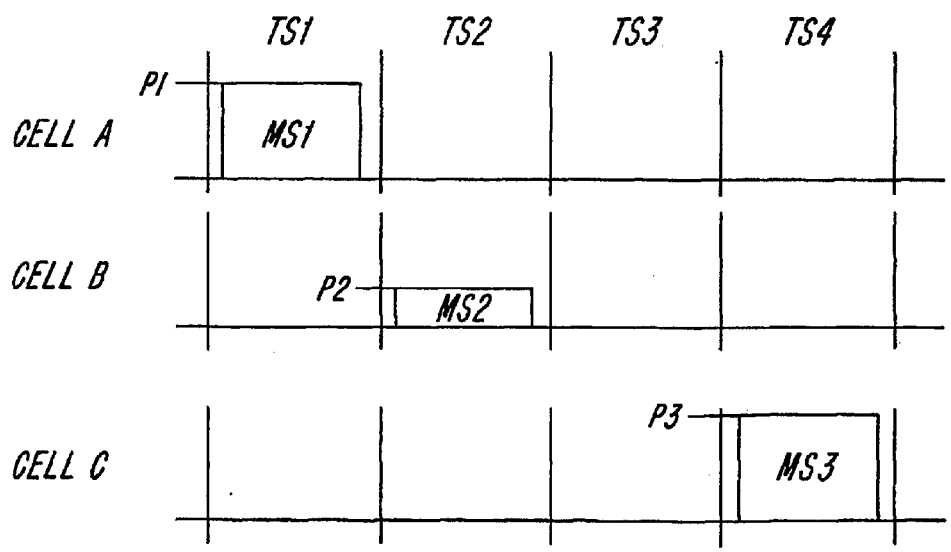
FIG. 5 illustrates how the base station of FIG. 4 can be operated in a GSM system to support communications with the mobile stations of FIG. 3.

FIG. 5 provides an example illustrating how base station 400 can be operated to transmit to the mobile stations of FIG. 3 in virtual cells in a GSM radio communication system. As will be appreciated by those skilled in the art, in the GSM system, there are eight time slots available on each frame of each carrier frequency (only four of which are shown in FIG. 5.) In this example, three mobiles 300 (MS1), 310 (MS2) and 320 (MS3) are assigned time slots TS1, TS2 and TS4, respectively, on the same carrier frequency f1. Base station 400 transmits to each mobile station MS1, MS2 and MS3 using a different transmit power level P1, P2 and P3, respectively. Using the selector 470, carrier frequency f1 from transmux 1 can be fed through the appropriate path of combiners 480, 490 to the radio part associated with the appropriate cell in its assigned time slot. In this example, the base station transmission power can be set individually for each mobile station by the base band processing unit 410, e.g., using a form of conventional, downlink power control described above, which thereby forms a first mechanism for downlink power control (DPC1).

As illustrated in FIGS. 4 and 5, the conventional base station architecture can reuse the carrier frequency f1 to transmit to different mobile stations located within different virtual cells at different downlink power levels as long as signals used by each mobile station are transmitted solely within an assigned time slot (e.g., the signals for MS2 are transmitted only during time slot TS2 and so forth). This permits the base station 400 to have sufficient time to adjust its output transmit power from one time slot to another time slot, i.e., ramping from P1 to P2 to P3. However, a problem arises when this conventional architecture is implemented, for example, in Digital Advanced Mobile Phone Service (ANSI 136) radiocommunication systems.

Figure 6:
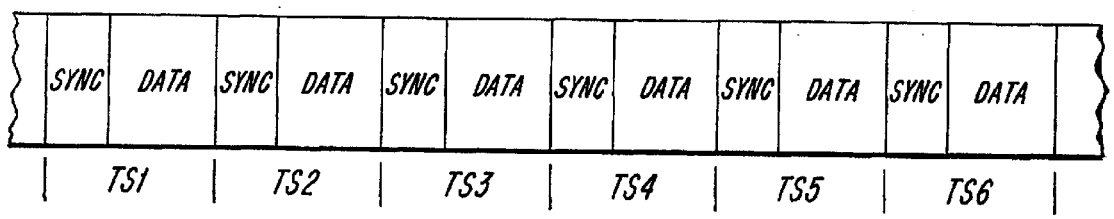
FIG. 6 illustrates a timeslot/frame format according to ANSI 136 specifications.
Figure 7:
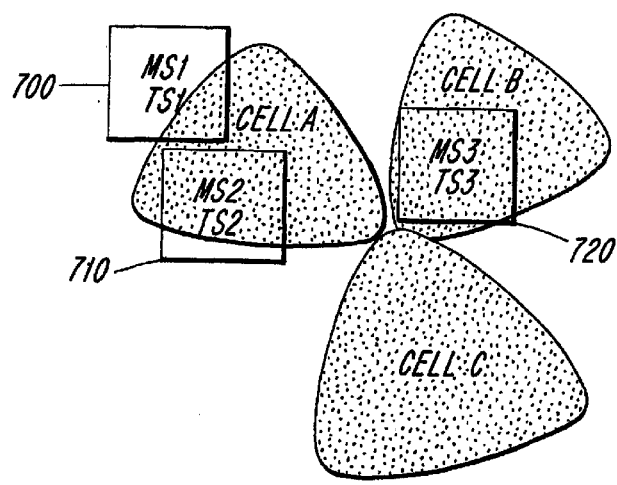
FIGS. 7 and 8 illustrate how the base station of FIG. 4 can be operated in a ANSI 136 system.

As will be appreciated by those skilled in the art, and as illustrated in FIG. 6, in ANSI 136 systems there are three time slot pairs available on each frame of each carrier frequency for a full rate channel assignment. For example, a mobile station can be assigned TS1 and TS4 or TS2 and TS5 or TS3 and TS6. As seen in FIG. 6, within each time slot a burst includes a synchronization preamble (SYNC) and a data portion (DATA). In fact, as will be appreciated by those skilled in the art, the DATA portion in each time slot's burst is further subdivided into various fields specified by the ANIS-136 standard, however these other fields are not particularly relevant for this discussion. The mobile station, which is listening during its assigned time slots in each frame, can then synchronize to the DATA portion of each burst by, for example, performing a series of correlations of the known SYNC pattern to the received burst to locate the beginning of the DATA portion.

However, some mobile station manufacturers have decided, in order to improve the accuracy of a mobile station's time synchronization, to evaluate the SYNC patterns which are transmitted in the time slot after a mobile station's assigned time slot. That is, a mobile station which is assigned, for example, to time slot pair TS2 and TS5 on a particular carrier frequency may also attempt to synchronize to the SYNC field(s) in TS3 as part of its decoding process for the DATA portion of its TS2 burst. In this way, if the SYNC field in TS2 is highly degraded and good synchronization to this field is not possible, a more accurate time synchronization will be achieved using the TS3 SYNC field and better decoding of the payload data will be possible. Thus, mobile stations for the ANSI 136 system may use not only signals transmitted within its assigned time slot but also part of the time slots after its own assigned time slot in order to synchronize with the network.

This characteristic of certain ANSI 136 mobile stations should then be taken into consideration when determining the base station's downlink transmit power. For example, the base station 400 may need to transmit each carrier frequency with virtually the same power in all cells which have a mobile station allocated to one of that carrier's time slot pairs. Consider the example illustrated in FIGS. 7 and 8. Therein, three mobile stations 700 (MS1), 710 (MS2) and 720 (MS3) have been assigned the three available time slot pairs, TS 1/4, TS 2/5 and TS 3/6, respectively, on the same carrier frequency f1. However, MS3 is located closer to the base station 400 (not shown in this Figure) than MS1 and MS2. Thus, the base station 400 transmits at a relatively high power level P1 to MS1 and MS2, and at a relatively low power level P2 to MS3. Since MS2 may be using the SYNC portion transmitted in TS3, the base station must continue to transmit at power level P1 during the SYNC portion of the TS3 burst so that MS2 can accurately receive and process the synchronization patterns. Moreover, since the downlink power control mechanism DPC1 is established for each carrier frequency, the base station 400 is emitting signal energy on carrier f1 in cells A and B at a relatively high level. This causes additional co-channel interference which is undesirable.

Figure 9:
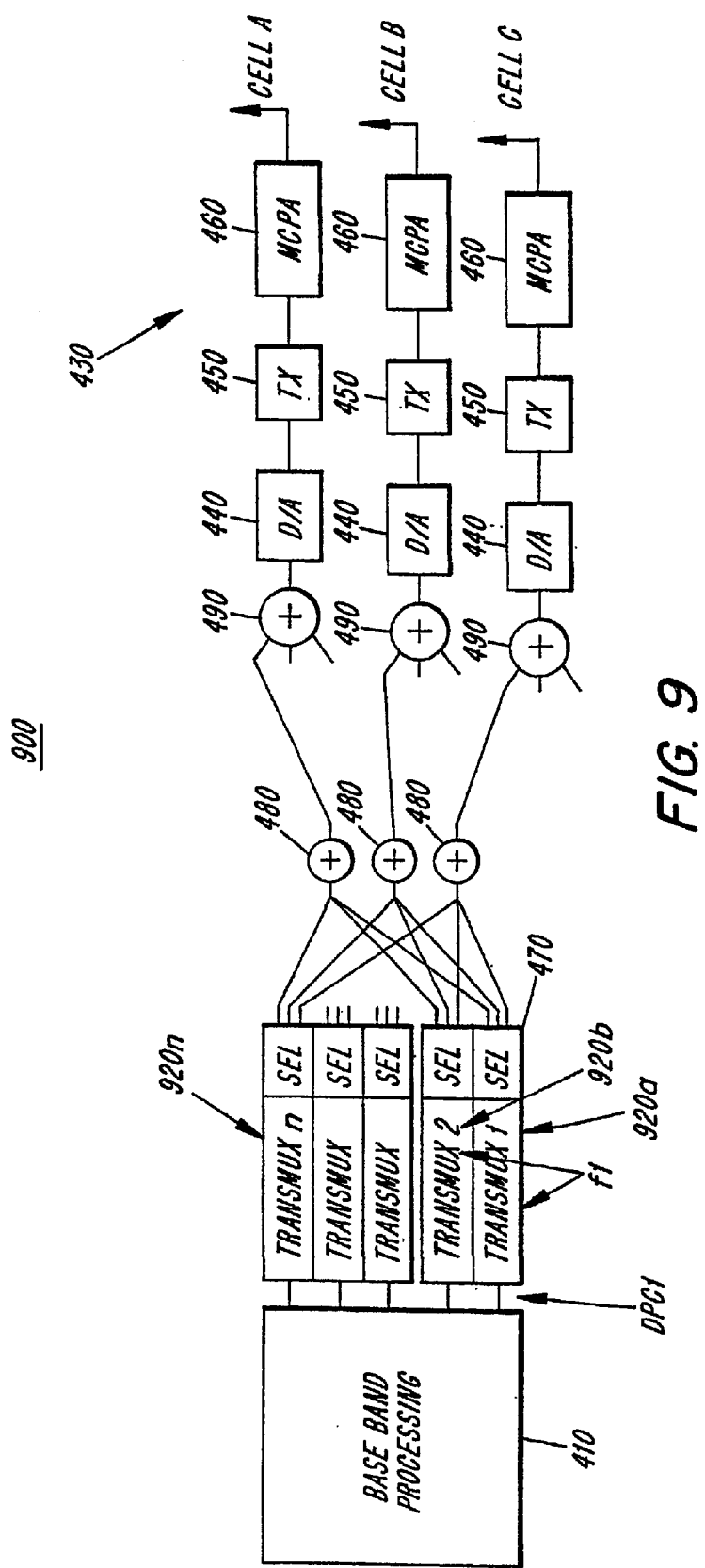
FIG. 9 illustrates a modified base station configuration related to the present invention.

One possible solution to provide improved downlink power control while also satisfying mobile stations which use SYNC from multiple time slots is to modify the base station to employ two transmuxes per carrier frequency. FIG. 9 shows base station 900 which includes a base band processing unit 410 and a set of transmuxes 920a–n. Unlike base station 400, base station 900 utilizes two transmuxes to handle one carrier frequency (e.g., both transmuxes 920a and 920b for frequency f1), thus the number of carriers that base station 900 can support is less than base station 400 for the same number of transmuxes.

Figure 10:
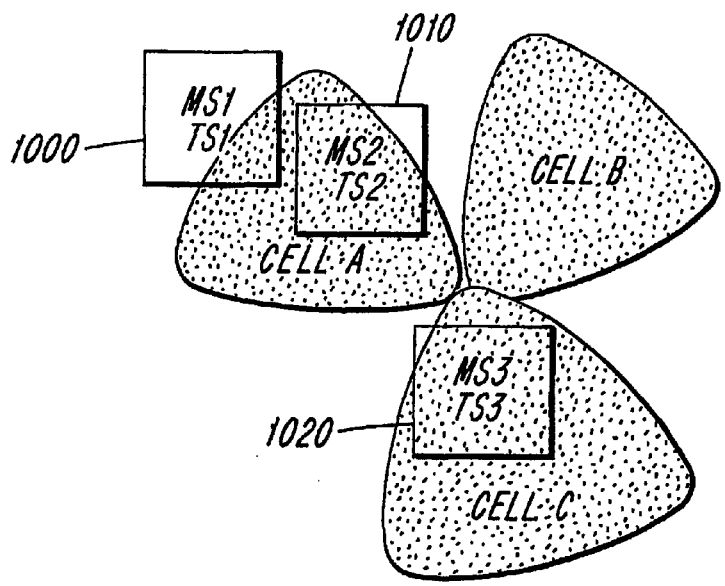
FIGS. 10 and 11 illustrate how the base station of FIG. 8 can be operated in a ANSI 136 system.
Figure 11:
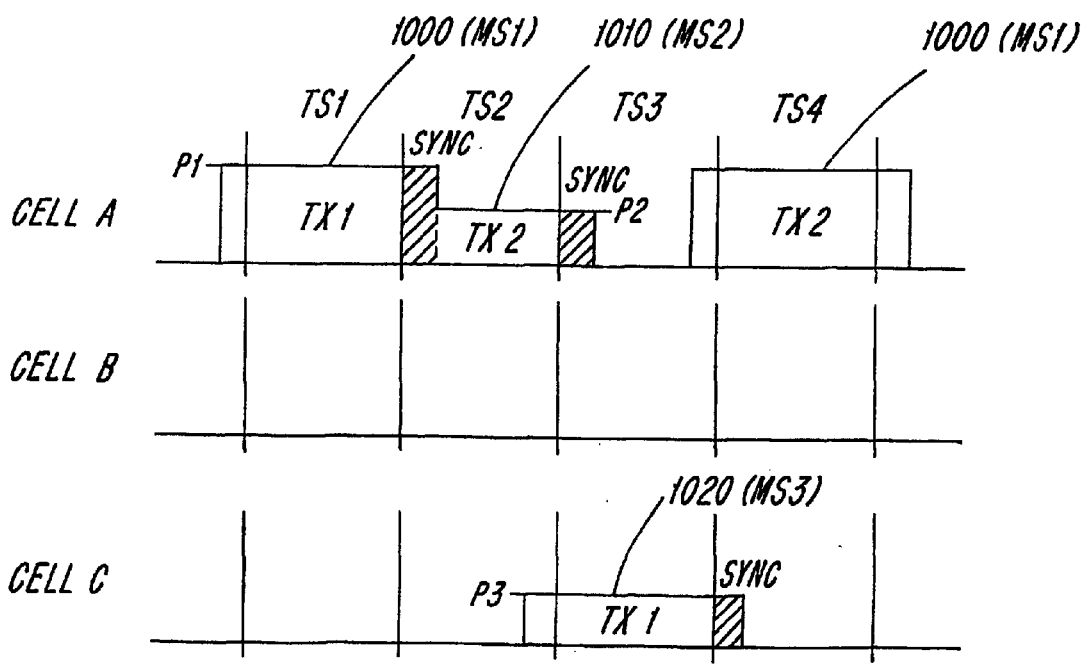

FIGS. 10 and 11 illustrate how base station 900 can provide improved downlink power control albeit at the expense of extra transmuxes. As illustrated in FIG. 10, both mobile stations 1000 (MS1) and 1010 (MS2) are in cell A with MS1 being located further away from base station 900 than MS2. Referring now to FIG. 11, base station 900 uses time slot TS1 and transmux 920a to transmit to MS1 at transmission power level P1. Since MS1 may need the SYNC portion of the burst that is transmitted in TS2, base station 900 continues transmitting the SYNC information in TS2 at power level P1 using the second transmux 920b. After the SYNC portion of TS2 has been transmitted, base station 900 uses the second transmux 920b to transmit information modulated onto carrier frequency f1 at a lower level P2, which power level is more appropriate for MS2 given its closer proximity to base station 900. Similarly, base station 900 uses the second transmux 920b to transmit the SYNC portion of TS3 in cell A at power level P2, thus enabling MS2 to use that SYNC portion of TS3. After the SYNC portion of TS3, base station 900 uses the first transmux 920a at power level P3 and selects radio part 430 associated with cell C. Again, base station 900 continues to transmit the SYNC portion of TS1 in cell C at power level P3, thus enabling MS3 to use the SYNC portion of TS1. At the same time, when it is time to transmit to MS1 again in TS4, base station 900 can set the second transmux 920b to power level P1 and use selector 470 to select the radio part 430 for cell A.

Therefore, base station 900 is able to individually control transmission power for each mobile station. However, as noted above, the configuration of base station 800 has a limited capacity due to the use of two transmuxes per carrier frequency. Thus, it is an object of the present invention to efficiently control downlink transmit power in virtual cells without reducing the capacity of the base stations.

Figure 12:
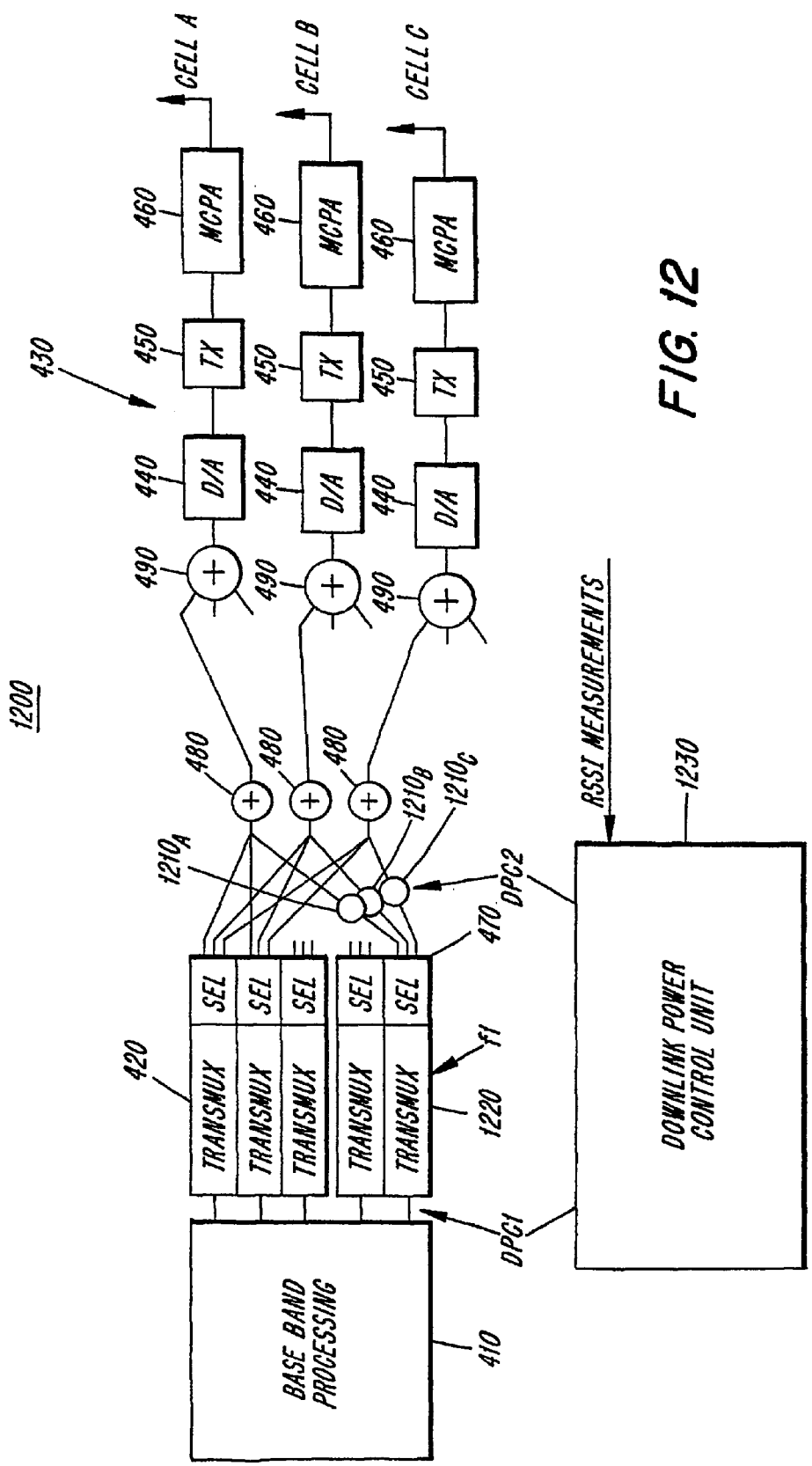
FIG. 12 illustrates a base station in accordance with an exemplary embodiment of the present invention.

Referring now to FIG. 12, a base station 1200 according to an exemplary embodiment of the present invention is illustrated. Therein, blocks performing similar functions as in FIG. 4 retain the same reference numerals. Thus, base station 1200 includes a base band processing unit 410 and a set of transmuxes 420 which are common to all sectors supported by base station 1200, as well as one wide band radio part 430 for each sector. In this embodiment, each transmux handles one carrier frequency. An attenuator $1210_A$, $1210_B$ or $1210_C$ is used to couple each output of a selector 470 and a corresponding combiner 480. Each attenuator $1210_A$–$1210_C$ is individually controllable to set the downlink transmission power level for each mobile station and thereby forms a second mechanism for downlink power control (DPC2) on the carrier frequencies. The attenuation factors/values for each attenuator can be set by downlink power control unit 1230 based upon, for example, signal strength measurements reported by mobile stations.

Those skilled in the art will appreciate that, although only three attenuators are depicted in FIG. 12 for clarity of the figure, base stations implemented according to this exemplary embodiment of the present invention will typically have sets of attenuators associated with each transmux 420. Moreover, depending upon the number of independent antenna elements associated with each base station, each transmux 420 may have more or fewer than three attenuators associated therewith.

Figure 8:
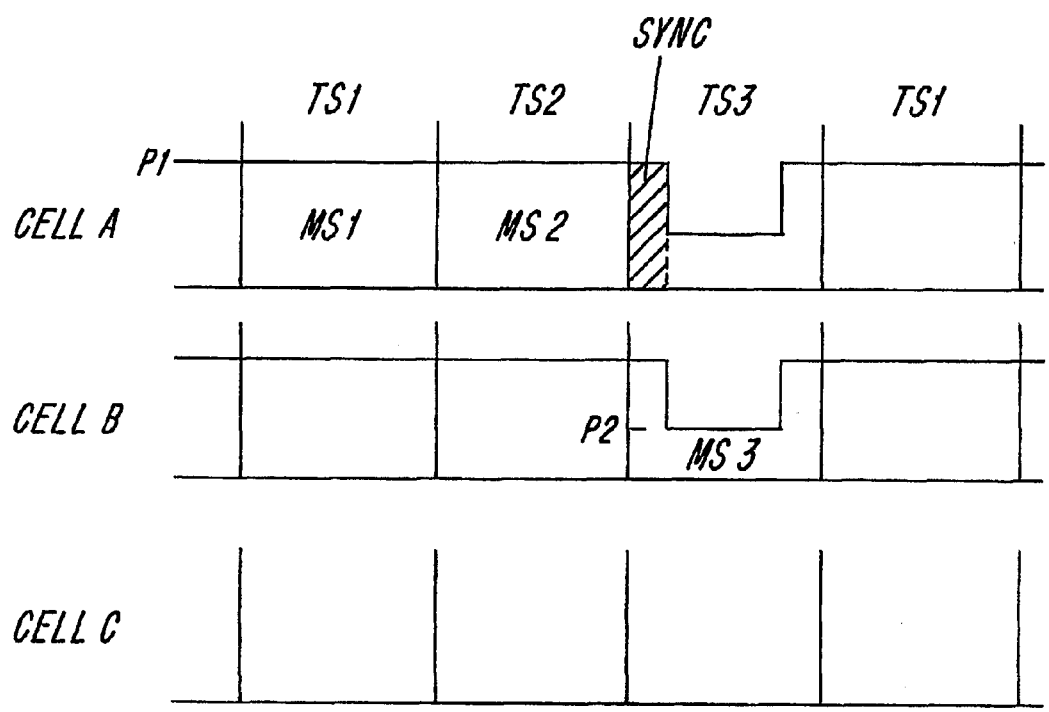
Figure 13:
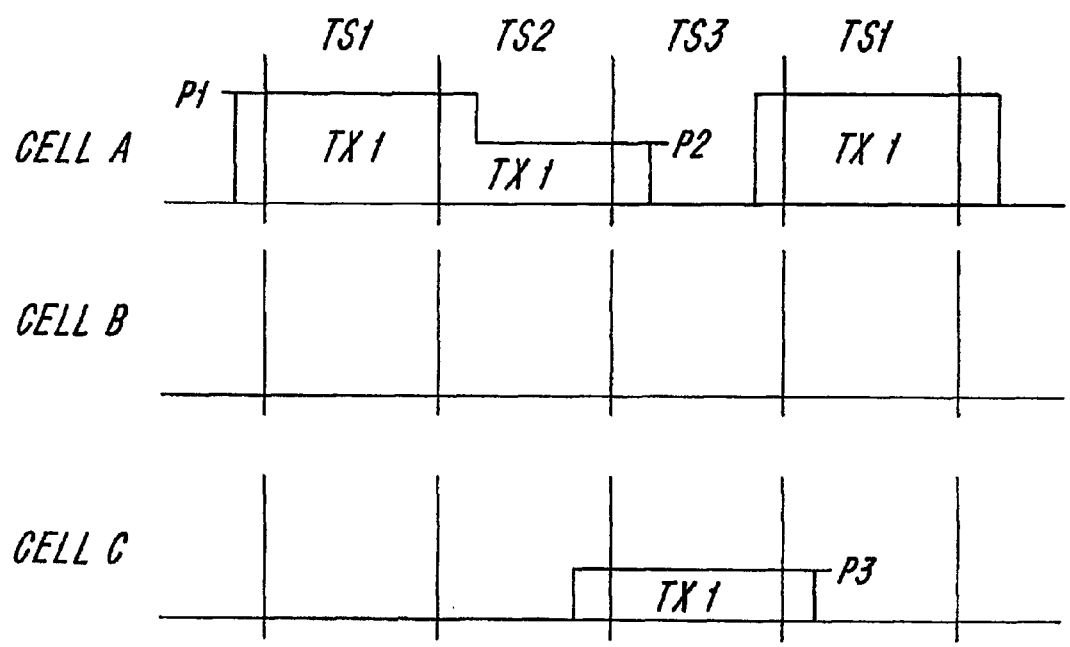
FIG. 13 illustrates how the base station of FIG. 12 can be operated in a ANSI 136 system.

FIG. 13 illustrates the downlink transmission power levels for each of the mobile stations 1000 (MS1), 1010 (MS2), and 1020 (MS3) which were shown and described with respect to FIG. 10, that are now being supported by the base station 1200. While the power levels P1, P2 and P3 in FIG. 13 are the same as those illustrated in FIG. 11, it will be immediately apparent that, unlike FIG. 11, all of the transmissions to mobile stations MS1, MS2 and MS3 are here performed using only a single transmux (TX1) 1220 to communicate with all three of the mobile stations. This is accomplished as follows. First, beginning at time slot TS1, base station 1200 transmits to MS1 by using selector 470 to select the path including attenuator 1210$_A$ that feeds a signal through the radio part 430 associated with cell A. At the same time, the downlink power control unit 1230 adjusts the setting of attenuator 1210$_A$ such that the output power level of the signal coupled to the cell A antenna by MCPA 460 is power level P1. When it is time to transmit in time slot TS2, base station 1200 continues to transmit the SYNC portion of that time slot at power level P1 by maintaining the setting of attenuator 1210$_A$. After the SYNC portion of time slot TS2 has ended, the downlink power control unit 1230 can adjust the setting of attenuator 1210$_A$ such that a reduced power level P2 emanates from the cell A antenna. At time slot TS3, selector 470 is also operated to select the path including attenuator 1210$_C$ such that signal energy is also coupled to the cell C antenna. Downlink power control unit 1230 sets the attenuator 1210$_C$ such that the output power emanating from the cell C antenna is the power level P3. Note that, since the base station 1200 should continue to transmit in cell A during the SYNC portion of time slot 3, the selector 470 also continues to select the path through attenuator 1210$_A$ during this time period. Thus, the configuration of the base station of FIG. 12 permits reuse of the carrier frequency F1 for each mobile station at their own tailored downlink power level using only one transmux 1220. In addition, the base station transmits in the respective virtual cell sector of each mobile station only when needed. In this way, interference associated with the signaling in these virtual cells is decreased as compared with, for example, the operation of base station 400 as depicted in FIG. 8, where, for example, the signals are transmitted in cell B during the entire duration of TS1 and TS2 although MS1 and MS2 are in cell A.

Base stations and methods for transmitting in radiocommunication systems according to the present invention have a number of different advantages. For example, by implementing the configuration illustrated in FIG. 12, a coarse and fine (DPC1 and DPC2) control loop combination can be implemented. Moreover, the selectors 470 can be eliminated and the attenuators 1210$_A$ through 1210$_C$ can be used to perform both power control and path selection in the base station. By using only one transmux per carrier frequency, the amount of hardware is minimized. This, in turn, increases the serving capacity of base stations since transmux hardware is typically a limiting factor associated therewith. Additionally, it now becomes possible to use a minimum of power output from the MCPA in cell sectors and time slots where no transmissions are needed, e.g., the time slots associated with the signal processing chain for cell B in FIG. 13. This promotes additional power savings and interference reduction.

Moreover, another advantage of base stations and methods according to the present invention involves the fact that the step error associated with DPC2 downlink power control is lower than that associated with DPC1 power control. This result stems from the fact that regulation after the transmux is performed at a higher sample rate as will be recognized by those skilled in the art.

It should be noted that the present invention has been described in accordance with exemplary embodiments, which are intended to be illustrative in all aspects, rather than restrictive. Thus, the present invention is capable of many variations in detailed implementation, which may be derived from the description contained herein by a person or ordinary skill in the art. All such variations are considered to be within the scope and spirit of the present invention as defined by the following claims.

What is claimed is:

1. A base station comprising:
   a baseband processing unit for generating a plurality of baseband information signals;
   a plurality of transmux devices each of which is associated with a different carrier frequency and which each receive one of said plurality of baseband information signals and upconvert said plurality of baseband information signals to their respective channel frequencies; and
   at least one attenuator associated with each of said plurality of transmux devices for selectively attenuating each of said upconverted baseband information signals, wherein each of said attenuators can be set to different values to provide downlink power control,
   wherein the processing unit comprises instructions for:
      generating a plurality of baseband information signals;
      upconverting said plurality of baseband information signals to their respective channel frequencies; and
      selectively attenuating each of said upconverted baseband information signals using a plurality of attenuators, wherein each of said attenuators can be set to different values to provide downlink power control; and
      transmitting in a first cell sector during a first timeslot using a first power level;
      transmitting in a second cell sector during a second timeslot using a second power level; and
      transmitting in said first cell sector during a first part of said second timeslot using said first power level.

2. The base station of claim 1, further comprising:
   a downlink power control unit for receiving information associated with downlink, measured signal strengths and for setting said attenuators based on said received information.

3. The base station of claim 1, further comprising:
   a plurality of transmit processing chains, each including a digital-to-analog converter, a radio frequency upconverter, a power amplifier and an antenna, wherein each of said transmux devices can be selectively connected to each of said plurality of transmit processing chains.

4. The base station of claim 3, wherein each of said plurality of transmit processing chains provides radio coverage in a separate cell sector.

5. The base station of claim 3, further comprising:

a selector device connected between each of said transmux devices and said at least one attenuator for selectively connecting said transmux devices with said transmit processing chains.

6. The base station of claim 3, wherein said attenuators perform the function of selectively connecting said transmux devices with said transmit processing chains.

7. A method for downlink power control in a radiocommunication system comprising the steps of:

generating a plurality of baseband information signals;

upconverting said plurality of baseband information signals to their respective channel frequencies; and selectively attenuating each of said upconverted baseband information signals using a plurality of attenuators, wherein each of said attenuators can be set to different values to provide downlink power control; and transmitting in a first cell sector during a first timeslot using a first power level;

transmitting in a second cell sector during a second timeslot using a second power level; and transmitting in said first cell sector during a first part of said second timeslot using said first power level.

8. The method of claim 7, further comprising the step of:

receiving information associated with downlink, measured signal strengths and setting said attenuators based on said received information.

9. The method of claim 7, further comprising the step of:

connecting said upconverted baseband information signals to selected transmit processing chains.

10. The method of claim 9, wherein said transmit processing chains each include a digital-to-analog converter, a radio frequency upconverter, a power amplifier and an antenna.

11. The method of claim 9, further comprising the step of:

using a selector device to perform said step of selectively connecting.

12. The method of claim 9, further comprising the step of:

performing said step of attenuating and said step of selectively connecting jointly.

13. The method of claim 7, wherein said first part of said second timeslot includes synchronization information.

14. The method of claim 7, wherein said attenuators control the power level in said first and second cell sectors respectively.

15. The method of claim 7, further comprising the step of:

transmitting in said first cell sector during a second part of said second timeslot using a third power level, wherein said third power level is different than said first power level.

* * * * *